United States Patent Office 3,531,185
Patented Sept. 29, 1970

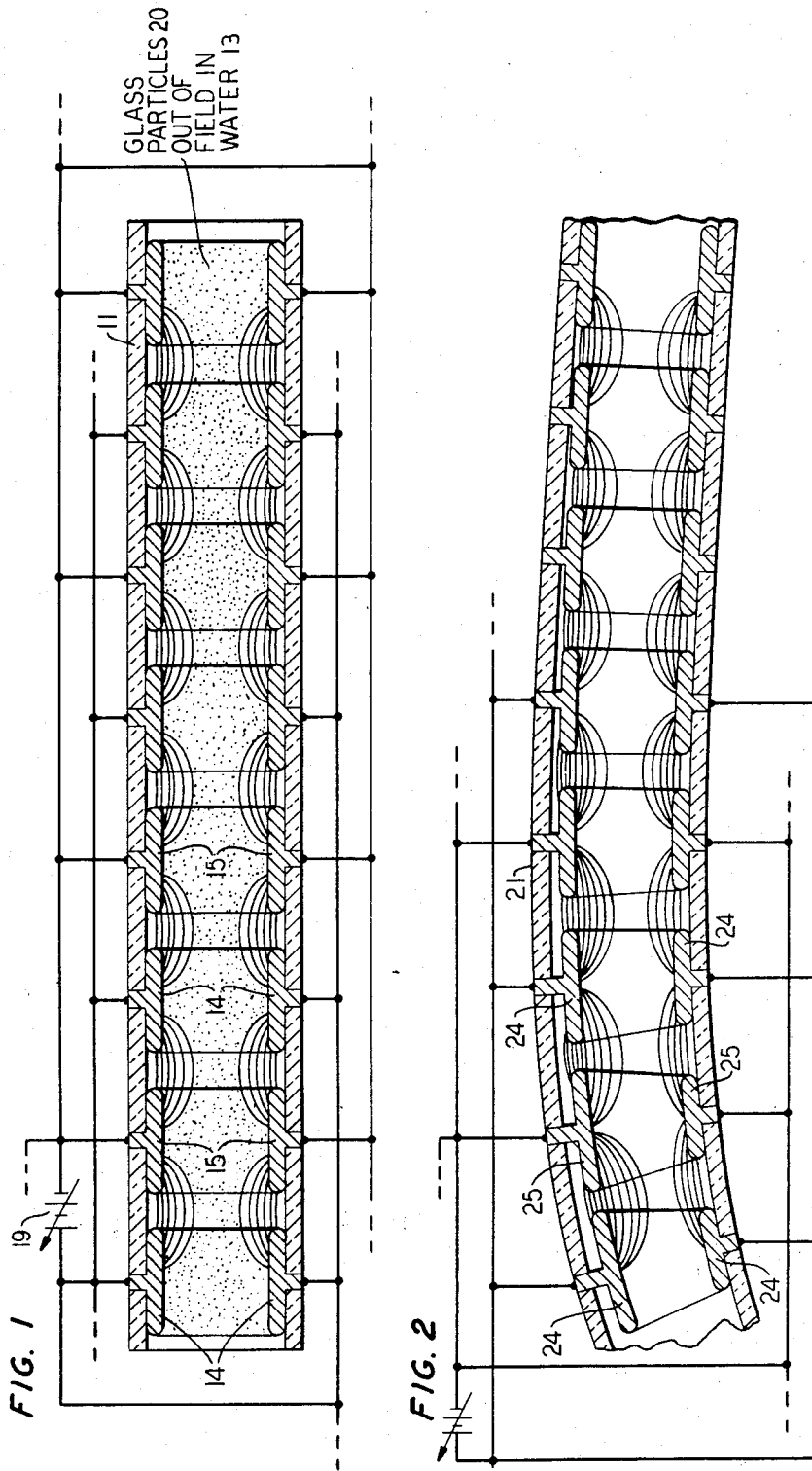

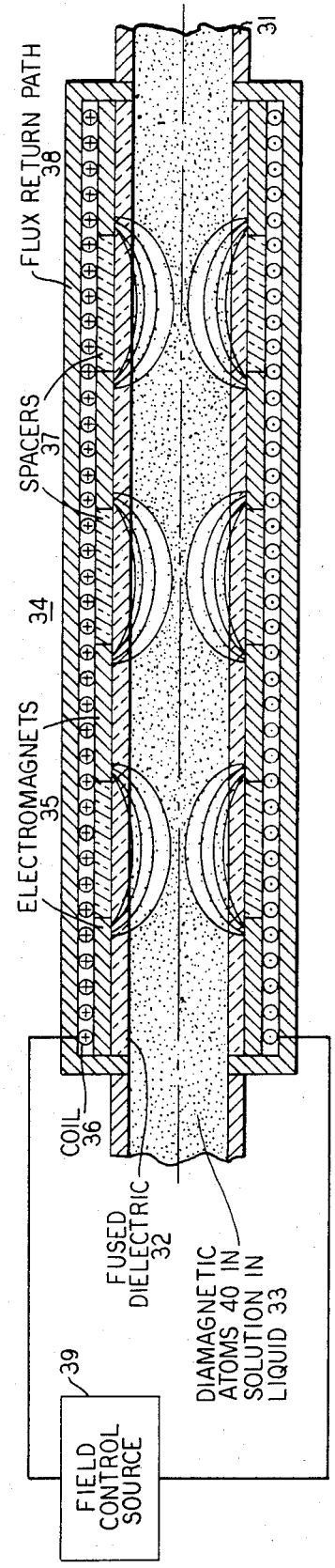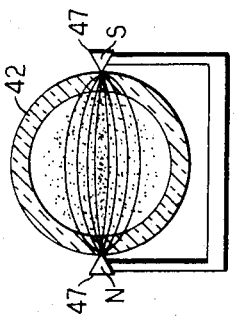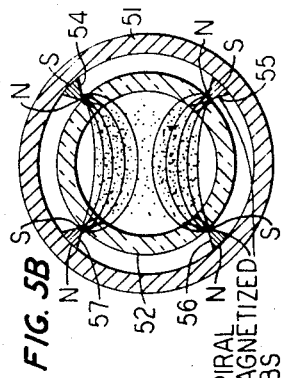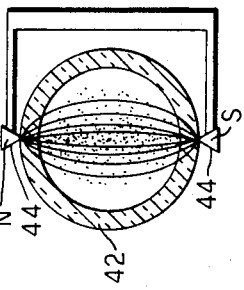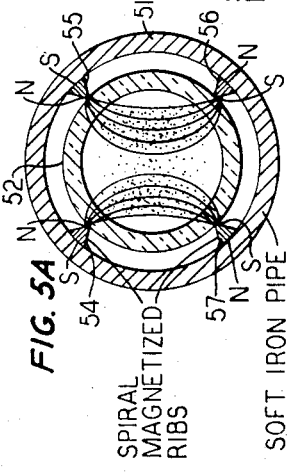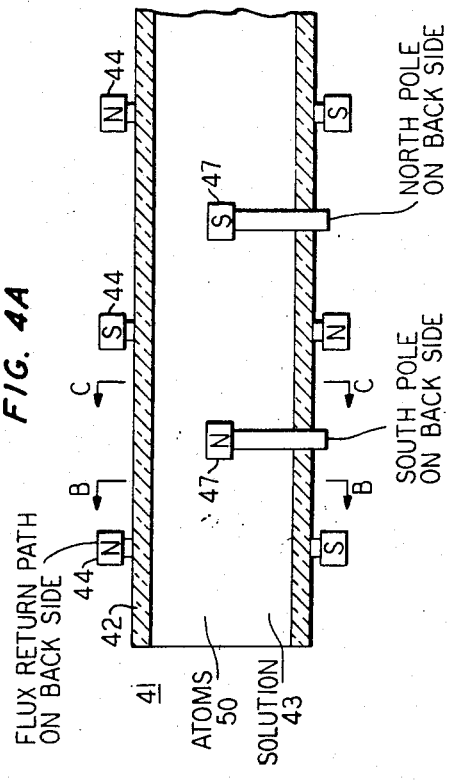

3,531,185
LIQUID LENS OPTICAL GUIDE EMPLOYING NEUTRAL PARTICLES SUPPORTED IN THE LIQUID
Solomon J. Buchsbaum, Westfield, and Daniel Weiner, Keyport, N.J., assignors to Bell Telephone Laboratories, Incorporated, Murray Hill, N.J., a corporation of New York
Filed Oct. 25, 1967, Ser. No. 677,926
Int. Cl. G02b 1/06, 5/14
U.S. Cl. 350—179     16 Claims

ABSTRACT OF THE DISCLOSURE

Liquid lenses for focusing transmission in optical communication systems are disclosed. The lenses employ liquid supporting particles that scatter light coherently in the forward direction and can be controlled by application of an electric or magnetic field to the assembly to produce a lens-like distribution of the particles. The liquid or the particles, or both, can be directly responsive to the applied field. Either can have permanent or induced magnetic or electric dipole moments.

BACKGROUND OF THE INVENTION

This invention relates to the transmission of electromagnetic waves. More particularly, it relates to the transmission and repetitive focusing of optical electromagnetic waves. As used here, optical electromagnetic waves are those from the limit of the microwave region (about 1000 microns or one millimeter wavelength) through all shorter wavelengths, such as far infrared, infrared, visible and ultraviolet.

Coherent optical electromagnetic wave generators, such as lasers, and mixers and amplifiers that maintain the coherence, have been discovered and are being developed to a level of practicability for communication use. Coherency refers to those properties of a beam of electromagnetic wave energy which obtain when all portions of it have substantially fixed or predictable phase relationships. Among the properties are a divergence of the beam not substantially greater than required by the laws of diffraction and, typically, a relatively narrow band of wavelengths as compared to incoherent optical beams.

Nevertheless, the transmission of beams of coherent optical electromagnetic wave energy over distances typical in communication systems is accompanied by a very appreciable spreading of the beam, reducing the portion of the energy that can be received at a distant station intended to receive the beam.

In many instances, it is desired that the coherent optical beam be transmitted through an enclosing pipe or conduit to provide improved privacy of communication and protection from unfavorable changes of atmospheric conditions, such as rain, snow, sleet, fog, temperature effects and the like.

Since the cross-sectional dimensions of the pipe are many times the wavelength of the coherent optical radiation and its walls appear rough at the optical wavelengths, multiple reflections of the energy from the conduit walls as the beam spreads degrade the coherency of the beam and distort the transmitted signals. Thus, focusing of the beam to counteract its spreading is important even when an enclosing conduit is employed.

The use of thin solid lenses of glass, or the like, for focusing the beam introduces somewhat greater losses for the light beam than would be desirable, especially when the lenses are closely spaced to provide the most effective focusing action.

It has heretofore been proposed to use gas lenses to obtain lower total loss. Lens-like density gradients in the gas are induced by temperature gradients, for example. While this technique is promising, stronger low-loss focusing effects would be desirable. For example, a stronger focusing system would allow for much sharper bends in the transmission pipe than with gas lenses. Thus, a system having lower cost for purchase of transmission right-of-way should be realizable.

In addition, control by heating produces a substantial power consumption that may be undesirable in some instances and does not lend itself readily to fine, or verniertype control, except with relatively slow response times. Thus, a system with less power consumption and greater capability of fast, fine control would be desirable.

SUMMARY OF THE INVENTION

According to our invention, we have recognized that relatively strong low-loss focusing effects may be achieved in a liquid lens transmission system.

According to a feature of our invention, a liquid lens comprises a liquid medium that supports particles, such as dissolved atoms, ions or colloidal particles, capable of scattering coherent light coherently in the forward direction and means for controlling the liquid and the particles by an applied energy field to produce a lens-like distribution of the particles in the light-beam path.

The liquid and the bulk material from which the particles are made are chosen to be transparent to the wavelength of energy being transmitted and focused. Either or both of the liquid and the particles are illustratively chosen to have a permanent or induced magnetic or electric dipole moment. An induced dipole moment is one that appears under the influence of an applied magnetic or electric field.

BRIEF DESCRIPTION OF THE DRAWING

Further features and advantages of our invention may be understood from the following detailed description, taken together with the drawing, in which:

FIG. 1 illustrates, in diagrammatic form, an illustrative embodiment of the present invention with an electric field configuration symbolically mapped thereon;

FIG. 2 illustrates a modification of the embodiment of FIG. 1 for directing and focusing the light around a bend in the transmission pipe;

FIG. 3 illustrates, in diagrammatic form, a second illustrative embodiment of the invention with a radially symmetrical magnetic field configuration mapped thereon;

FIG. 4A illustrates, in diagrammatic form, a third illustrative embodiment of the invention for cylindrical strong focusing;

FIGS. 4B and 4C are cross-sectional views of the embodiment of FIG. 4A and have field configurations mapped thereon to show more clearly the cylindrical strong-focusing arrangement; and FIGS. 5A and 5B are cross-sectional views of a modification of the embodiment of FIG. 4A.

DESCRIPTION OF ILLUSTRATIVE EMBODIMENTS

In FIG. 1, a pipe or conduit 11 extends between stations in an optical communication system. The conduit 11 is composed illustratively of a fused dielectric material, such as glass. The diameter of conduit 11 will typically be many orders of magnitude greater than a wavelength of the wave energy being transmitted.

It is preferred that the entire length of conducit 11 be filled with the liquid in which the focusing action is to be achieved. The liquid 13, illustratively water, is chosen to be highly transparent to the wavelength being transmitted. It supports colloidal particles 20, illustratively glass. Preferably, the colloidal particles have dimensions that are at least two orders of magnitude smaller than the wavelength of the visible light being transmitted. Even though these particles are considerably larger than the individual atoms of which they are comprised, they are still sufficiently small to scatter light coherently in the forward direcion. That is, they absorb and reradiate most of the light coherently with the passing light wavefront.

Electrode rings 14 and 15 are spaced apart axially along the conduit 11 and are connected between the positive and negative terminals, respectively, of a direct-current voltage source 19. Since the effect is proportional to the square of the electric field, an AC voltage source may be substituted for source 19. The edges of electrode rings 14 and 15 are rounded in order to prevent the excessively high electric field gradients that occur at sharp corners. The applied DC voltage creates a fringing, but essentially axial, electric field between an electrode section 14 and a nearby electrode section 15.

In operation of the invention, the electric field source 19 and the electrode rings 14 and 15 establish an electric field configuration and a configuration of the colloidal glass particles as indicated on the diagrammatic showing of FIG. 1. The water molecules have a very large permanent electric dipole moment, such that the low-frequency dielectric constant (about 80) of the water, which determines its response to the electric field, is much larger than the corresponding dielectric constant (about 4) of the glass.

It will be seen that the electric field configuration and its effect are desirable as follows. For any cross-sectional area perpendicular to the axis of the conduit 11, the electric field intensity is minimum at the center of the area. That is, the electric field intensity is minimum on the axis of the conduit and increases with radius away from the axis. The glass colloidal particles 20 have a much lower low-frequency dielectric constant than the water and, therefore, tend to migrate out of a region of high electric field intensity and are replaced by equal volumes of water. The colloidal particles will thus have their greatest concentration near the axis of the conduit, in the region of weakest intensity of the electric field. Since the glass particles have an index of refraction of 1.5 as compared to 1.33 for water, the resulting index of refraction gradient is that which is desired for a converging lens.

Note that the indices of refraction are determined by the high-frequency, or optical, dielectric constants and that these have opposite relative sizes as compared to the low-frequency dielectric constants because of the differing dispersions of water and glass. The same principles can be used in various modified embodiments of the invention when radially symmetrical focusing arrangements are desired.

Viewed from another aspect, the glass particles introduce dielectric "holes" into the water, since the water responds more strongly than the particles to the applied field. This principle of introducing dielectric holes into a field-responsive liquid makes it unnecessary to use cylindrical strong-focusing arrangements when, as is typical, the suspended particles have a higher index of refraction than the suspending liquid.

The effect of the focusing action upon rays of light propagating along the axis of conduit 11 and tending to diverge from the axis according to the laws of diffraction will be to bend the diverging rays back toward the axis. The entire assembly is equivalent to a series of closely spaced, weakly focusing, radially symmetrical lenses. The strength of each lens and spacing from adjacent lenses is adjusted so that light propagating through the conduit does not tend to reach the walls.

Directing of the light around a bend in the conduit 11 may be achieved by a number of different techniques. One of the techniques simply involves a regular spacing of the lens units around the bend. Light rays follow lenses disposed periodically around a bend of radius R with a displacement of the center of the mode, or beam, from the center of the lenses by an amount $\Delta R$ given by $$\Delta R = \frac{\rho f}{R} \qquad (1)$$

where $\rho$ is the spacing of the lenses and $f$ is the focal length.

In a confocal arrangement, this becomes $$\Delta R = \frac{\rho^2}{2R} \qquad (2)$$

This $\Delta R$ corresponds to a change in direction by an angle $\alpha$ where $$\alpha = \frac{\rho}{R} = \frac{2\Delta R}{\rho} \qquad (3)$$

If $\Delta R$ is fixed to avoid light loss from the system, then as the radius, R, of the bend decreases, the lens spacing $\rho$ must also decrease and will vary according to the square root of R to provide the needed increase in the angle $\alpha$.

Another technique for directing light around a bend in a transmission pipe employs prisms or mirrors. Still another would employ a modification of the principles of the present invention. In the latter technique, the greatest concentration of the material with the high index of refraction is established on the inside of the bend by an appropriate distortion of the applied electric or magnetic field.

Such a modified embodiment is illustrated in FIG. 2. Here the electrodes 24 and 25 are sections of cylinders cut oblique to their axes so they are most closely spaced on the outside of the bend and most widely spaced on the inside of the bend. At the center of the pipe where the light beam is to travel, the weakest fields are provided by the widely spaced electrodes on the inside of the bend. Thus, the glass particles tend to migrate to the inside of the bend and establish the highest index of refraction there.

Also, the modified embodiment of FIG. 2 illustrates the effect of a transverse displacement of a lens unit to accentuate the bending of the light beam. In this case, the portions of the electrodes on the outside of the bend are displaced toward the center of the pipe to provide stronger field gradients than would otherwise exist.

Preferred parameters for the embodiments of FIGS. 1 and 2 are the following. The colloidal particles have an index of refraction of about 1.5 and are 10 angstrom units in diameter for focusing light in the visible portion of the spectrum. They illustratively have a concentration of five per percent by volume in the water. Cooperating electrode sections 14 and 15 are axially separated from one another by about 0.1 centimeter center-to-center and have an edge-to-edge separation of about 0.025 centimeter. They are biased by about 1,000 volts from source 19. This voltage could be balanced with respect to ground potential to reduce dielectric stress in conduit 11. These parameters can vary within wide limits depending upon the strength of the focusing action desired. The wavelength range in which the suspension has lowest overall attenuation is centered near 5,000 A. and would include the 4,800 A. laser line of ionized argon.

We have also recognized that colloidal suspensions of lithium niobate (LiNbO$_3$) particles in the polyfluorinated heptane C$_7$F$_{16}$ can also be achieved and that they could be constrained to assume cylindrical lens-like strong-focusing distributions, magnetic species of which will be described hereinafter, by an arrangement of electrode sections applying electric fields in opposed quadrants, which are shifted 90° in orientation in successive focusing regions. These particles are ferroelectric in nature and have permanent eletric dipole moments. They have a higher low-frequency dielectric constant than C$_7$F$_{16}$ and will tend to migrate into regions of highest electric field in C$_7$F$_{16}$.

Similarly, colloidal suspensions including other field-responsive liquids or particles, such as liquids or particles that have permanent magnetic or electric dipole moments or that have dipole moments induced by electric or magnetic fields, can be achieved. For example, it appears that colloidal suspensions are readily made from superparamagnetic magnesioferrite particles, such as described by G. P. Wertz and M. E. Fine in the article "Superparamagnetic Magnesioferrite precipitates from Dilute Solutions of Iron in MgO" in the Journal of Applied Physics, volume 38, page 3729, August, 1967. Preferably, one would employ those particles in the smaller size ranges, as obtained by aging at 800 degrees centigrade. The above-cited article also indicates one way to obtain particles of appropriate size for colloidal suspensions. Other techniques include grinding.

Certain atomic particle solutions may be advantageously employed in practicing our invention. An example of such a solution is found in the modified embodiment of FIG. 3.

In the illustrative embodiment of FIG. 3, the liquid 33, illustratively water or a Freon, such as polyfluorinated heptane ($C_7F_{16}$), is chosen to be highly transparent to the radiation being transmitted and supports suitable particles 40 therein in solution. The particles are diamagnetic atoms in solution and illustratively may be benzene atoms.

In the region in which a lens-like distribution of the particles is to be achieved in order to provide focusing action, electromagnets 34 comprising annuli 35 of soft iron material girdle the fused dielectric 32 at regular spacings. The electromagnets 34 also include the common field coil 36 which is wound throughout the length of the focusing section in a position to supply flux through the annuli 35. Between the electromagnetic annuli are the dielectric spacers 37, which are annuli of a dielectric material such as glass or quartz. Extending for the entire length of the focusing section is the flux return path 38 of soft iron material, which illustratively forms part of the juncture between the fused dielectric 32 and the remaining portion of conduit 31. The same field configuration could be obtained with permanent magnets with less power loss but less control. (Or perhaps a combination of both could be used.)

The coil 36 is connected to a field control source 39, which supplies an appropriate current through the coil 36 in order to establish fringing flux fields between the ends of annuli 35. These flux fields extend to, or near to, the axis of the conduit 31 and dielectric 32.

Focusing sections such as shown in FIG. 3 are periodically spaced along the entire transmission path.

In the operation of the embodiment of FIG. 3, the electromagnets establish a flux field configuration and a configuration of the diamagnetic atoms as shown mapped symbolically on FIG. 3. It will be seen that the north and south poles of all of the annuli 35 have the same relative orientation. The flux field between a north pole and the nearest south pole will adopt a fringing configuration in which the flux lines, or effective field, fans out to occupy its greatest volume at a point midway between the two poles. As in the embodiment of FIG. 1, the intensity of the magnetic field is least on the axis of the conduit 31. The diamagnetic atoms 40 are characterized in that they tend to migrate away from a region of high magnetic field toward a region of lower magnetic field. They will thus have their greatest concentration, and the solution will have its greatest density, near the axis of the conduit.

It will be seen that the solution 33, on the average, will have its greatest density on the axis and its lowest density farthest from the axis, particularly adjacent to the dielectric spacers 37. The effect of this distribution of diamagnetic atoms, which is radially symmetrical, upon rays of light propagating along the axis and tending to diverge therefrom according to the laws of diffraction will be to bend the diverging rays back toward the axis. This cooperation occurs provided the index of refraction of diamagnetic solute (e.g., benzene) is larger than that of solvent (water). Otherwise, the total effect will be to diverge the light, in which case the configuration of FIG. 4A might be used. The entire assembly of FIG. 3 is equivalent to a series of closely spaced, weakly focusing, radially symmetrical lenses. Obviously the strength of each lens and spacing from adjacent lenses is preferably adjusted so that the light propagating through the conduit does not tend to reach the walls.

The concentration of benzene, illustratively a one mole percent solution, is varied until the desired strength of focusing action is obtained.

It should be noted that the diamagnetic atoms 40 are sufficiently small particles, that is, much smaller than a wavelength of the light transmitted, so that they scatter light coherently in the forward direction. In other words, they reradiate light coherently with the light they absorb.

In order to obtain a stronger focusing effect than that of FIG. 3 in a solution employed in a liquid lens, it would be desirable to use paramagnetic atoms in solution. It is characteristic of paramagnetic atoms that they migrate toward a region of high magnetic field from a region of lower magnetic field. In the simplest possible arrangement, the magnetic field is applied from outside the conduit; and the paramagnetic solute has a higher index of refraction than the solvent. In this case, a radially symmetrical field would have a defocusing action. We propose to avoid this undesired result by either of two techniques, one of which employs strong focusing with cylindrical lens like elements, as illustrated in the embodiment of FIG. 4A.

Strong focusing is a technique first taught in the electron-beam art in one version of which focusing alternates periodically with defocusing with relative spacings such that a net focusing action results. It can be shown that, where the converging focal length is $f_1$ and the diverging focal length is $(-f_1)$ and the effective distance between the centers of the focusing and defocusing in the same plane is $\rho$, the net effective focal length, F, of the combination is:

$$F = \frac{f_1^2}{\rho} \qquad (4)$$

If the converging and diverging focal lengths are unequal, the relationship becomes more complex but the principle remains basically the same. A net focusing action can be obtained. We provide cylindrical strong focusing by focusing in one coordinate while defocusing is occurring in the orthogonal coordinate, and vice versa. A stronger net average focusing effect is achieved in the embodiment of FIG. 4A than in the embodiment of FIG. 3 because a stronger physical effect is producible with paramagnetic atoms or ions than with diamagnetic atoms or ions.

In particular, in the embodiment of FIG. 4A, the fused dielectric 42 illustratively serves as the conduit 41 throughout the length between communicating stations and is enclosed by the vertically oriented permanent magnet sections 44 and the horizontally oriented permanent magnet sections 47. The magnet sections 44 and the sections 47 alternate axially along the conduit, optionally in a manner so that a line drawn through successive north poles would trace a helix and a line drawn through successive south poles would trace a helix. It can be shown that a twisted U-shaped magnet spiraling continuously along conduit 41 and having poles occupying the corresponding positions of poles of sections 44 and 47 would also provide a cylindrical strong-focusing effect. Contained within the conduit of fused dielectric 42 is a solution 43, illustratively a one mole percent solution of paramagnetic atoms 50 of cobalt dichloride ($CoCl_2$) in water.

The operation of the embodiment of FIG. 4A may be more fully explained with reference to the configuration of the fringing flux field and the relative concentrations of the paramagnetic atomic particles symbolically mapped on FIGS. 4B and 4C. These configurations differ from those shown in FIG. 3 in that the flux configurations are symmetrical about a plane passed through the axis of the assembly rather than being symmetrical about the axis and in that the paramagnetic atoms have their greatest concentration in the regions of highest field. For example, in the plane of section B'B', as shown in FIG. 4B, the fringing flux exists in the greatest strength toward the top and bottom of the conduit, and is weakest at the horizontally disposed sides and has medium strength toward the center. The paramagnetic particles concentrate in direct relation to the strength of the field. The light passing through this region is focused in the horizontal plane because the average density of the solution is less near the side walls of the conduit than near the axis. On the other hand, the light passing through this region will be defocused in the vertical plane because the density of the solution in the vertical plane is much higher near the axis than near the walls of the conduit with a smooth gradient therebetween. In the next succeeding region of conduit, the relationships are reversed, as indicated in FIG. 4C. The light is now defocused in the horizontal plane and focused in the vertical plane. As explained above with reference to Equation 4 a net focusing effect is obtained.

As in the embodiment of FIG. 3, the paramagnetic atoms 50 in the embodiment of FIG. 4A scatter light coherently in the forward direction so that minimal attenuation is obtained. Copper sulfate ($CuSO_4$) could be substituted, with approximately double the concentration, for cobalt chloride in the preceding embodiment for use in the blue region (4,000 A.–4,800 A. wavelength), since copper sulfate is moderately paramagnetic and highly transmissive in that region.

An alternative configuration for cylindrical strong focusing is indicated diagrammatically in FIGS. 5A and 5B, which represent successive cross sections along a light pipe or conduit.

The dielectric conduit 52 includes a colloidal suspension of paramagnetic ions having a higher index of refraction than the suspending liquid. A soft iron pipe 51, serving as a magnetic flux return path, encloses the conduit 52 and has on its interior surface the spiraling magnetic ribs 54, 55 (north poles at the exposed edge), 56 and 57 (south poles at the exposed edge). After these spiral ribs are separately formed and magnetized, they are pressure fit between conduit 52 and pipe 51. This double dipole arrangement produces a magnetic flux configuration as shown. This configuration has higher flux density gradients than the configuration of FIG. 4A because, within conduit 52, the top and bottom in FIG. 5A and the sides in FIG. 5B are practically devoid of flux. The spiraling of ribs 54–57 may be followed from FIG. 5A to FIG. 5B. The focusing action in FIG. 5A is qualitatively the same as in FIG. 4C; and the focusing action in FIG. 5B is qualitatively the same as in FIG. 4B.

A second technique for employing paramagnetic materials to produce a net focusing action would combine a paramagnetic liquid and an essentially nonmagnetic solute of higher refractive index in a magnetic structure like that of FIG. 3.

It will be obvious to a person skilled in the art that analogous structures employing solutions of dielectric and paraelectric atomic particles may be made, with suitable applied electric fields, to the extent that the dielectric or paraelectric material can be introduced into solution. As examples of the latter, we propose, first, guanidine aluminum sulfate, $(H_2NCNHNH_2)_2 \cdot Al_2SO_4$, in water or, second, trioxane,

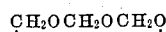

in an appropriately transmissive organic solvent or a freon.

Colloidal suspensions useful in practicing our invention could also include polymers, proteins, and viruses selected to be substantially transparent to the wavelength of light being transmitted. In addition, either they or the supporting liquid would be selected to be field-responsive.

In all cases it is desirable to select particles and a liquid that have nearly equal densities. Nevertheless, the effects of density differences between the particles and the supporting liquid can be compensated by various techniques, such as slow flow of the mixture.

We claim:
1. A liquid lens for a beam of electromagnetic wave energy in the optical portion of the spectrum, comprising
   an elongated conduit having transverse cross-sectional dimensions many times greater than the wavelength of said wave energy,
   a substantially transparent liquid having a first index of refraction contained within said conduit, said liquid containing transparent neutral particles capable of scattering said wave energy coherently predominantly in the forward direction and having a second index of refraction different from said first index of refraction, said particles having a dipole moment and thereby responding to a nonuniform control electromagnetic field supplied through said liquid by migrating in a direction of changing field strength, and
   means for supplying through said liquid a nonuniform control electromagnetic field having a field strength changing in a direction transverse to said axis to generate a lens-like distribution of said particles in said liquid.

2. A liquid lens according to claim 1 in which the particles are atomic particles in solution in the liquid, and in which the field-supplying means supplies an electromagnetic field interacting with the dipole moments of said particles through said liquid in a pattern to generate a lens-like distribution of said particles in said liquid.

3. A liquid lens according to claim 1 in which the particles are diamagnetic atoms in solution in the liquid, said diamagnetic atoms having magnetic dipole moments, and in which the field-supplying means supplies a magnetic field interacting with said magnetic dipole moments through said liquid to generate an axially symmetrical lens-like distribution of said particles in said liquid.

4. A liquid lens according to claim 1 in which the particles are paramagnetic atoms in solution in the liquid, said paramagnetic atoms having magnetic dipole moments, and in which the field-supplying means supplies a magnetic field interacting with said magnetic dipole moments through said liquid in a pattern to generate a strong-focusing cylindrical lens-like distribution of said particles in said liquid.

5. A liquid lens according to claim 1 in which the particles are colloidal particles in suspension in the liquid, and in which the field-supplying means supplies an electromagnetic field interacting with the dipole moments of said particles through said liquid in a pattern to generate a lens-like distribution of said particles in said liquid.

6. A liquid lens according to claim 5 in which the suspended particles have dimensions substantially smaller than the wavelength of the wave energy.

7. A liquid lens according to claim 5 in which the colloidal suspension comprises neutral lithium niobate particles in the polyfluorinated heptane $C_7F_{16}$, and the field-supplying means comprises means for applying an electric field to said suspension to create the lens-like distribution of particles.

8. A liquid lens according to claim 1 in which the electromagnetic field-supplying means comprises a plurality of magnetic units substantially periodically spaced along the elongated conduit, the length of each of said units being a major portion of its center-to-center spacing from adjacent units.

9. A liquid lens according to claim 8 in which the magnetic units comprise electromagnets, said electromagnets including a common induction coil.

10. A liquid lens according to claim 8 in which the magnetic units comprise permanent magnets.

11. A liquid lens according to claim 1 in which the electromagnetic field-supplying means comprises a plurality of pairs of electrodes periodically spaced along the elongated conduit, the axial length of each of said electrodes being a major portion of the center-to-center spacing from adjacent electrodes axially.

12. A liquid lens for a beam of electromagnetic wave energy in the optical portion of the spectrum, comprising
   an elongated conduit having transverse cross-sectional dimensions many times greater than the wavelength of said energy,
   a substantially transparent liquid having a first refractive index contained within said conduit and having a dipole moment, said liquid containing transparent neutral particles capable of scattering said wave energy coherently predominantly in the forward direction and having a second refractive index different from said first refractive index, said liquid responding to a nonuniform control electromagnetic field supplied through said liquid by causing said particles to migrate in a direction of changing field strength, and
   means for supplying through said liquid a non-uniform control electromagnetic field having a field strength changing in a direction transverse to said axis to generate a lens-like distribution of said particles in said liquid.

13. A liquid lens according to claim 12 in which the particles are colloidal particles in suspension in the liquid, and in which the field-supplying means supplies an electromagnetic field interacting with the dipole moment of said liquid in a pattern to generate a lens-like distribution of said particles in said liquid.

14. A liquid lens according to claim 13 in which the suspended particles have dimensions substantially smaller than the wavelength of the wave energy.

15. A liquid lens according to claim 13 in which the colloidal suspension comprises neutral glass particles in water, and the field-supplying means comprises means for applying an electric field to said suspension to create the lens-like distribution of particles.

16. A liquid lens according to claim 12 in which the electromagnetic field-supplying means comprises a plurality of pairs of electrodes periodically spaced along the elongated conduit; the axial length of each of said electrodes being a major portion of the center-to-center spacing from adjacent electrodes axially, said pairs of electrodes being disposed and shaped to provide an electric field of substantially axially symmetrical distribution when electrically energized.

References Cited

UNITED STATES PATENTS

| | | |
|---|---|---|
| 3,169,163 | 2/1965 | Nassenstein. |
| 3,386,787 | 6/1968 | Kaplan _____ 350—96 |
| 3,399,012 | 8/1968 | Peters _____ 350—96 |

JOHN K. CORBIN, Primary Examiner

U.S. Cl. X.R.

350—161